Figure 1:
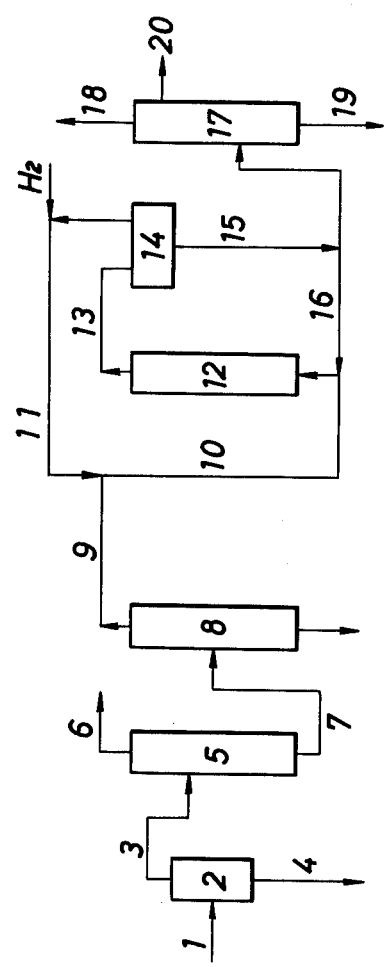

United States Patent [19]

Sato

[11] 4,039,712
[45] Aug. 2, 1977

[54] PROCESS FOR PRODUCING A SOLVENT FOR USE IN MICROCAPSULE FOR PRESSURE-SENSITIVE COPYING PAPER

[75] Inventor: Atsushi Sato, Yokohama, Japan

[73] Assignee: Nippon Petrochemicals Company Ltd., Tokyo, Japan

[21] Appl. No.: 228,957

[22] Filed: Feb. 24, 1972

[30] Foreign Application Priority Data

Mar. 2, 1971 Japan .................................. 46-10543

[51] Int. Cl.² .............................................. B41M 5/16
[52] U.S. Cl. ...................................... 428/307; 428/537
[58] Field of Search .......................... 117/36.2, 36.8; 208/143; 428/307, 537

[56] References Cited

U.S. PATENT DOCUMENTS

| | | | |
|---|---|---|---|
| 3,016,308 | 1/1962 | Macaulay | 117/36.1 |
| 3,370,001 | 2/1968 | King | 208/143 |
| 3,409,684 | 11/1968 | Aristoff et al. | 208/143 |
| 3,627,581 | 12/1971 | Phillips | 117/36.2 |
| 3,637,484 | 1/1972 | Hansford | 208/143 |
| 3,691,060 | 9/1972 | Inwood | 208/143 |

*Primary Examiner*—Bernard D. Pianalto
*Attorney, Agent, or Firm*—Fisher, Christen & Sabol

[57] ABSTRACT

A process for producing a solvent for use in microcapsules for pressure-sensitive copying paper which comprises hydrogenating a hydrocarbon mixture with a boiling range of 290° - 400° C, which is obtained as a by-product in the decomposition of petroleum etc. and is containing polycyclic aromatic hydrocarbon compounds, at a temperature within a range of 100° - 400° C and in the presence of a hydrogenating catalyst capable of catalyzing nuclear hydrogenation so as to hydrogenate the aromatic rings of the compounds which contain at least three aromatic rings and are principal components of said polycyclic hydrocarbon compounds, leaving at least two aromatic rings therein intact.

4 Claims, 1 Drawing Figure

PROCESS FOR PRODUCING A SOLVENT FOR USE IN MICROCAPSULE FOR PRESSURE-SENSITIVE COPYING PAPER

This invention relates to a process for producing a solvent for use in microcapsules for pressure-sensitive copying paper.

Already known is a pressure-sensitive copying paper which is basically composed of a first paper sheet coated on one surface thereof with a capsule coating incorporating colorless color-forming agents in a state of solution thereof and a second paper sheet coated on one surface thereof facing said capsule coating with a clay or high-molecular material capable of reacting with said color-forming agents to develop a visible color thereon, said first and second sheets being superposed with said capsule coating and said clay or high-molecular coating facing each other and being subjected to a pressure to obtain a reproduction on said second sheet.

The copying mechanism in the pressure-sensitive copying paper of this kind consists of the breakage of the shells of microcapsules by means of an applied pressure such as of handwriting or typewriting resulting in the release of a solution of color-forming basic dye precursors incorporated in said microcapsules, and the contact of thus released solution with an acidic active clay or high-molecular material coated on a surface of the second sheet facing said capsule coating thereby developing a visible color.

Said solution of color-forming agents is a solution of dyes dissolved in at least one hydrophobic solvent, and is incorporated in the microcapsules. The solvents to be employed in the microcapsules for such pressure-sensitive copying paper are required to meet following conditions.

Said solvents are required to be capable dissolving the color-forming dye precursors, not to disturb the color-forming reaction between said color-forming agents and said clay or high-molecular material but to allow said reaction to proceed with sufficiently high reaction speed, to dissolve said high-molecular material thereby realizing an intimate contact thereof with said color-forming agents when such high-molecular material is in use, to be provided with a suitable volatility so as to be eliminated from the system after the color is developed, to remain liquid in said microcapsules, and to be intoxic and harmless to human body. In addition said solvents are required to be free from any disagreeable odor, and to be colorless when the color-forming dye precursors to be used are colorless.

Polychlorinated biphenyls have been widely utilized as the solvent for use in such microcapsules. These compounds, however, accumulate in human body and exhibit a significant toxicity thereto, which is becoming a serious problem when such copying paper is frequently handled manually for example in case of business forms. Consequently a novel harmless solvent meeting the above requirements has been longed for in order to replace polychlorinated biphenyls.

Among the hydrocarbon fractions obtained by the decomposition of petroleum etc., the fraction boiling above 200° C has found no practical application because of the specific color and odor thereof.

Such fraction is rich in polycyclic aromatic hydrocarbons such as naphthalene, alkylnaphthalenes, anthracene, phenanthrene and derivatives thereof, but the effective utilization of such components has not been made possible principally due to the multiplicity of said components and the difficulty of separation. The present inventors have found that said fraction can be utilized as an intoxic solvent capable of replacing polychlorinated biphenyls.

More specifically, the present invention is to provide a process for producing a solvent for use in microcapsules for pressure-sensitive copying paper which comprises hydrogenating a hydrocarbon mixture with a boiling range of 290° - 400° C, which is obtained as a by-product in the decomposition of petroleum etc. and is containing polycyclic aromatic hydrocarbon compounds, at a temperature within a range of 100° - 400° C and in the presence of a hydrogenating catalyst capable of catalyzing nuclear hydrogenation so as to hydrogenate the aromatic rings of the compounds which contain at least three aromatic rings and are principal components of said polycyclic hydrocarbon compounds, leaving at least two aromatic rings therein intact.

The starting material to be employed in the process according to the present invention is a hydrocarbon fraction with a boiling range of 290° - 400° C and rich in polycyclic aromatic hydrocarbons such as phenanthrene, anthracene and derivatives thereof which is obtained as a by-product in a process for producing ethylene, propylene, butenes or butadienes from hydrocarbon oils such as light or heavy naphtha, kerosene, light oil, heavy oil or crude oil by means of thermal or catalytic decomposition such as so-called steam cracking, gaseous pyrolysis, sand cracking etc.

Among the fractions boiling above 200° C by-produced in the decomposition of petroleum etc., particularly preferred as the starting material for the process of this invention is the fraction with a boiling range of 290° -400° C. A fraction boiling below 290° C rich in naphthalene, alkyl naphthalenes as the principal components of polycyclic aromatics will be associated, after hydrogenation, with odor disagreeable for use in said copying paper. Further hyrogenation in order to remove the odor will deteriorate the ability of dissolving the dye precursors. On the other hand a fraction boiling above 400° C will lead to a solvent with a dark color and too high viscosity which are unacceptable for such copying paper.

Hydrogenation is carried out in the presence of a hydrogenation catalyst having an activity capable of nuclear hydrogenation, for example nickel-cobalt-molybdenum, nickel-molybdenum, nickel-tungsten, cobalt-molybdenum, or sulfide thereof, platinum catalysts or copper-chromium catalysts. Hydrogenation in the present process should be carried out under such a condition as to realize partial nuclear hydrogenation on polycyclic aromatic hydrocarbons since complete nuclear hydrogenation will result in the products which are unusable as the solvent in the microcapsules. Preferred ranges of temperature and pressure for such hydrogenation are 100° - 400° C and 15 - 100 kg/cm$^2$.G, respectively. Also the ratio of hydrogen to the starting material is maintained within a range of 100 - 1000 m$^3$H$_2$/Kl, preferably 400 - 600 m$^3$H$_2$/Kl.

The hydrogenation in the process according to the present invention not only means partial nuclear hydrogenation of polycyclic aromatic hydrocarbons but also includes hydrogenation of olefins and of sulfur compounds and nitrogen compounds which are the cause of undesirable odor and coloration, thereby to remove the color and odor of the original oil fraction and to improve the ability thereof of dissolving the dye precursors employed in the pressure-sensitive copying paper. Excessive hydrogenation will lead to unnecessarily advanced hydrogenation on aromatic nuclei, dealkylation and fissure of aromatic nuclei and eventually to unsatisfactory dissolving ability. The hydrogenation to polycyclic aromatic hydrocarbons containing at least three aromatic rings which are the principal components of the starting material to be employed in the present invention should be limited so as to leave at least two aromatic rings intact in a molecule.

For example the hydrogenation on phenanthrene and anthracene should be limited to obtain dihydrophenanthrene, tetrahydrophenanthrene, dihydroanthracene, tetrahydroanthracene etc. Similar hydrogenation is required for the derivatives of phenanthrene and anthracene, and other aromatic hydrocarbons containing more than three aromatic rings. Such hydrogenation reaction changes the dark green color of the raw material oil to a very pale yellow, removes the specific disagreeable odor and enables to obtain an excellent solvent which is provided with an elevated dissolving ability for the dye precursors for the pressure-sensitive copying paper, and which is completely free from undesirable coloration, odor or toxicity such as in polychlorinated biphenyl.

Examples of the dye precursors employable in the pressure-sensitive copying paper are; diaryl phthalides, leucaul amines, acrylamines, $\alpha,\beta$-unsaturated arylketones, basic monoazo dyes, rhodamine-$\beta$-lactam such as N-(p-nitrophenyl)-rhodamine-$\beta$-lactam, polyaryl carbinol, 8'-methoxybenzoindolinospiropyrane (8'-BIPS) etc.

These dye precursors are basic, and the coated layer to be brought into contact with said dyes can be composed of a clay containing acidic active centers or acidic polymers such as phenol-aldehyde polymers, maleic acid-rosin resin, partially or completely hydrolyzed styrene-maleic anhydride copolymer, partially or completely hydrolyzed ethylene-maleic anhydride copolymer, carboxypolyethylene or partially or completely hydrolyzed vinylmethylether-maleic anhydride copolymer etc.

The solution of said dye precursors dissolved in suitable solvents can be microencapsulated by means of so-called coacervation process according to which the minute particles of said solution dispersed in an aqueous medium is covered by protective colloids such as gelatin or gum arabic, thereby obtaining microcapsules incorporating said solution. Also the microcapsules can be prepared by means of interfacial polymerization process according to which monomers, intermediates or oligomers are polymerized on the surface of minutely dispersed particles of said solution in the presence of polymerization initiators, polymerization accelerators or polymerization catalysts. The solvent according to the present invention can be employed in preparing microcapsules incorporating said solution of color forming agents by means of either process. In producing such microcapsules, it is already known to use an auxiliary solvent in addition to the principal solvent for dissolving said dye precursors in order to regulate the viscosity and volatility of said solution, the particle size of dispersed solution, solubility of said polymer material etc.

The solvent according to the present invention can be used in microencapsulation without utilizing such auxiliary solvents, since said solvent is composed of a number of hydrocarbon solvents showing a widened boiling range instead of a single component as in the polychlorinated biphenyl. The characteristics of the solvent according to the present invention, however, are by no means deteriorated by the use of such auxiliary solvents.

This invention will be further clarified in the following explanation with particular reference to the attached drawings, in which the FIGURE shows an example of the flow sheet of the present process.

In the flow sheet shown in the FIGURE, a high-boiling fraction with a boiling range of 200° – 460° C containing polycyclic aromatic hydrocarbons is introduced from a pipe 1 into a flush drum 2, and said high-boiling fraction from which heavy fraction (pitch and tar) is removed through a pipe 4 is further introduced, through a pipe 3 into a pre-distillation tower 5 and then through a pipe 7 into a pre-distillation tower 8. A light fraction and a heavy fraction are respectively removed from the top of said tower 5 through a pipe 6 and from the bottom of said tower 8 through a pipe 10, and a fraction with a controlled boiling range of 290° – 400° C is taken out from the top of said tower 8. Said pre-distillation towers 5 and 8 are maintained at a reduced pressure in order to prevent the decomposition of said fraction. Said pre-distillation towers 5 and 8 can be employed in the inverted order, or can be replaced by any other means or equipment capable of providing a fraction with a boiling range of 290° – 400° C by means of distillation.

The fraction obtained through the pipe 9 is mixed with hydrogen introduced through a pipe 11 and forwarded through a pipe 10 to a reactor 12 provided with a fixed catalyst bed. At this reaction it is also possible to employ a suitable diluent. The reaction mixture is taken out from the top of said reactor 12 through a pipe 13 and separated in a gas-liquid separator 14 into hydrogen and reaction product, which is forwarded through a pipe 15 into a distillation tower 17.

A part of the flow in the pipe 15 is recycled to the reactor 12 through a pipe 16. Light fraction and heavy fraction by-produced at the hydrogenation are removed respectively from the top of said tower 17 through a pipe 18 and from the bottom of said tower 17 through a pipe 19 respectively, and the final solvent is obtained through a pipe 20. The distillation in the tower 17 is preferably carried out under a reduced pressure. The removal of heavy fraction from the pipe 19 and of light fraction from the pipe 18 respectively improves the color and odor of the solvent. Said light fraction removed from the pipe 18 is returned to and utilized again in said reactor 12.

Following example shows a preferred embodiment of the process according to the present invention.

EXAMPLE 1

A. A fraction with a boiling range of 290° – 400° C obtained by distillation from a fraction with a boiling range of 200° – 460° C by-produced in an ethylene plant was hydrogenated according to the flow sheet shown in FIG. 1.

The hydrogenation was carried out under the conditions of a temperature 300° – 320° C, pressure 17 kg/cm$^2$.G, SV 0.5, and a ratio of hydrogen to raw material 400 – 600 m$^3$H$_2$/Kl and in the presence of a fixed bed catalyst of nickel-cobalt-molybdenum, and the solvent obtained by distillation after the hydrogenation showed excellent dissolving ability for various dye precursors, improved color and odor, and was free from toxic components.

The extent of hydrogenation was confirmed by mass spectrometer, and said solvent was found to be principally composed of components containing two aromatic rings pepresented by the general formulas $C_nH_{2n-18}$, $C_nH_{2n-16}$ and $C_nH_{2n-14}$ in which n ranges principally from 14 to 16.

B. Example of production of pressure-sensitive copying paper utilizing coacervation process microcapsules utilizing the above-mentioned solvent.

In this example crystal violet lactone (CVL) was used as the color forming agent, and the solvent therefor was solely composed of the solvent obtained as described above.

The color-forming solution was prepared by dissolving CVL in a 3% concentration in said solvent. A 1 wt.% aqueous solution of polyvinyl methylethermaleic anhydride copolymer, water and an 11% aqueous solution of gelatin were placed in a blender, and said color-forming solution was added under agitation and mixed until the dispersed particle size of said solution reached 5 microns or less.

The emulsion thus obtained was added with a solution of gum arabic, and the mixture was regulated to a pH value of 9 and then diluted with water under agitation. Coacervate was precipitated around said dispersed particles by gradually lowering the pH value until 4.6 by means of addition of 10% acetic acid. After said encapsulating step, the capsule shells were hardened by a known process adding glutaraldehyde. The first sheet material A of pressure-sensitive copying paper was prepared by coating thus obtained microcapsules on a paper sheet. The microcapsules thus prepared were identical in performance with those prepared with prior process employing polychlorinated biphenyl. The second sheet materials of pressure-sensitive copying paper respectively coated with clay B and and phenol-aldehyde copolymer C were respectively superposed with said first sheet material A so as that the capsule coating on the sheet material A and the coating or on said second sheet materials B or C face each other. Upon application of handwriting pressure on the non-coated surface of said first sheet material A, a blue image was obtained immediately on said second sheet materials B and C. The obtained copy was sharp and clear, and the color developing speed was recognized to be sufficiently fast.

REFERENCE EXAMPLE 1

The reaction was carried out using a same raw material as in the Example 1, and under the conditions of a pressure of 70 kg/cm$^2$.G, a temperature of 400° - 410° C, SV 0.2 and a ratio of hydrogen to raw material 400 - 600 m$^3$H$_2$/Kl in the presence of a nickel-cobalt-molybdenum catalyst.

The reaction resulted in decomposition of the raw material as well as the nuclear hydrogenation, and the yield thereof was of ca. one-third of that obtained in the Example 1. The obtained solvent showed a decreased dissolving ability for the dye precursors, and a slower color developing speed.

The analyses by mass spectrometer and NMR indicated that the product contained elevated proportions of tetrahydrated, octahydrated and higher hydrated components.

REFERENCE EXAMPLE 2

The process of Example 1 was reproduced except that the raw material was replaced by a naphthalene-containing fraction with a boiling range of 200° - 230° C and an alkylnaphthalene-containing fraction with a boiling range of 220° - 270° C. The reaction products showed strong odor which was quite unacceptable as the solvent. Repeated hydrogenation under same conditions was capable of eliminating the odor but decreased the dissolving ability for the dye precursors to a practically unsatisfactory range.

REFERENCE EXAMPLE 3

The process of the Example 1 was reproduced except that the raw material was replaced by a fraction with a boiling range higher than 400° C. The product showed undesirable color-forming rate and too high viscosity which were unacceptable as the solvent.

What is claimed is:

1. A pressure-sensitive copying material which comprises a paper sheet coated with microcapsules containing a dye precursor and a solvent for said dye precursor produced by hydrogenating a hydrocarbon mixture having a boiling range of 290° - 400° C., which is obtained as a by-product in the decomposition of a hydrocarbon oil and is rich in polycyclic aromatic hydrocarbon compounds, at a temperature within the range of 100° - 400° C. a pressure of 15-100 kg/cm$^2$ and a ratio of hydrogen to hydrocarbon mixture of 100-1,0000 m$^3$H$_2$/Kl in the presence of a hydrogenating catalyst capable of catalyzing nuclear hydrogenation so as to hydrogenate the aromatic rings of the compounds which contain at least three aromatic rings and are principal components of said polycyclic aromatic hydrocarbon compounds, leaving at least two aromatic rings therein intact.

2. The pressure-sensitive copying material according to claim 1 wherein the ratio of hydrogen to hydrocarbon mixture is 400-600 m$^3$H$_2$/Kl.

3. The pressure-sensitive copying material according to claim 1 wherein the hydrocarbon oil is petroleum.

4. The pressure-sensitive copying material according to claim 1 wherein the hydrogenating catalyst is a member selected from the group consisting of nickel-cobalt-molybdenum catalyst, nickel-molybdenum catalyst, nickle-tungsten catalyst, cobalt-molybdenum catalyst, cobalt-molybdenum sulfide catalyst, platinum catalyst and copper-chromium catalyst.

* * * * *